Patented July 10, 1951

2,559,645

UNITED STATES PATENT OFFICE 2,559,645

METHOD OF BLENDING POLYETHYLENE-AMORPHOUS PETROLEUM WAX COMPOSITIONS

Robert G. Larsen, Albany, Calif., and August A. Schaerer, Amsterdam, Netherlands, assignors to Shell Development Company, San Francisco, Calif., a corporation of Delaware No Drawing. Application December 26, 1946, Serial No. 718,592

9 Claims. (Cl. 260—28.5)

The present invention relates to novel compositions which are capable of adhering satisfactorily (as a protective coating) to solid metal, yet being peelable as a continuous sheet from the surface of the metal whenever so desired.

In the past, the use of various wax compositions as a coating on non-adhesive surfaces of various objects, for example, metals, was not wholly satisfactory. These objects were usually coated to protect them from the corrosive action of air and moisture, or from the action of various liquid media. Although many of the petroleum waxes were satisfactory, for example, insofar as forming a coating on a metal and protecting it from corrosion for the duration of the coating, the latter could not be removed except by scraping and chipping it off, or by melting, or dissolving in special solvents. Removal of wax coatings from various objects was thus tedious, time consuming and costly. Wax which was removed mechanically usually broke into innumerable small pieces. Many of the previous wax coatings were sticky and tacky, did not maintain a coating over sharp corners, and were insufficiently hard and resistant to abrasion. The old wax coatings were also readily worn through by rubbing, or were readily punctured by impact with dull objects.

It is therefore an object of the present invention to overcome the above and other defects. It is another object of the present invention to provide a novel coating composition which will adhere firmly to a surface of the object, particularly metal, e. g. steel, and which will protect the coated object from the normal effects of a contiguous atmosphere, and yet be capable of being readily stripped or peeled off from the foundation surface.

It has now been discovered that the above and other objects are attained by compositions essentially comprising a substantially oil-free amorphous petroleum wax and between about 1.5 wt.% and about 30 wt.% of a polyalkylene having a molecular weight of at least about 10,000, and preferably with an average molecular weight between about 16,000 and about 35,000. In a more preferred embodiment, such a coating composition should comprise or consist of an amorphous petroleum wax and between about 3 wt.% and about 20 wt.% of the polyalkylene, particularly polyethylene. Such novel compositions possess materially improved properties in that they are peelable as a continuous sheet from the surface of a solid metal coated with the composition. The peeled off sheet has approximately the same thickness and apparent physical properties as the coating per se when present on the metal. Yet such coating adhered satisfactorily to the metal or other non-adhesive surface of an object until such time as the coating was deliberately removed e. g. by cutting through its thickness and then forcibly pulled off.

The present compositions also are superior in resistance to abrasion and to rupture by impact with a relatively dull object; they are also remarkably free from tackiness and excessive adhesiveness. Because of the latter property, the coated articles may be stacked or packed against each other without their sticking together. Thus, the present coatings are unlike those obtained by the use of the amorphous petroleum wax coatings per se, for they are too tacky and stick together.

It was further discovered that the above described material improvements are attained by a homogeneous blend of amorphous petroleum wax and between about 3 wt.% and about 20 wt.% of polyethylenes having an average molecular weight between about 16,000 and about 22,000. In most cases, particularly useful and advantageous blends are obtained with concentrations of polyethylene of between about 5 wt.% and about 15 wt.% based on the weight of the total composition.

In general, amorphous petroleum waxes having a melting point of between about 40° C. and about 88° C. are particularly suitable for use with the polyethylene for attaining the objects of this invention. In some cases, depending upon its source, an amorphous wax having a melting point within the range of from about 40° C. to about 60° C., may have too much adhesiveness and softness to be made sufficiently peelable by incorporation of 5 wt.% to about 10 wt.% of polyethylene. In such case, more than about 10 wt.% and up to about 15 wt.%, or even up to about 20 wt.%, of polyethylene when blended into the wax, provides a satisfactory peelable coating composition. The amorphous waxes used herein may contain a few per cent, e. g. 0.1 wt.% to about 0.3 wt.% of oil, depending upon the relative ratios of polyethylene and wax, and also the qualities of a specific wax used in attaining an overall composition within the scope of this invention; however, it is preferred to use an amorphous petroleum wax which has been substantially completely deoiled.

The term "amorphous petroleum wax" as employed herein includes not only the amorphous waxes per se, but also mixtures containing an amount of hydrocarbon waxes having sufficient branching and/or cycloaliphatic groups so that the wax fraction has the familiar amorphous character. Straight chain paraffin waxes may be present in an amorphous petroleum wax so long as the blend retains the amorphous character upon crystallization or solidification. On the other hand, normal paraffin waxes, or waxes having the straight-chain type of crystalline character can not be used in place of the amorphous petroleum waxes in the present invention.

Amorphous petroleum wax may also be defined as being a wax which crystallizes only into relatively soft or plastic "microcrystalline" wax. This intrinsic character of amorphous petroleum wax is retained even when the liquefied form is allowed to cool and solidify under conditions in which straight chain paraffin wax normally shows its distinguishing and characteristic brittle, non-plastic property. Thus, the amorphous kind of wax has an inherent amorphous-crystallizing property because of its distinct structural composition.

Amorphous petroleum wax essentially contains branches (i. e. side-chain alkyl groups) and/or cycloaliphatic rings. Most such waxes possess noticeable adhesiveness and tackiness; many of those commonly employed in industry have a melting point range of between about 60° C. and about 88° C., which is higher than many of the melting points of the normal-paraffin waxes used commercially. An amorphous petroleum wax usually has about the same boiling point (for a given molecular weight) as the non-amorphous n-paraffinic wax of the same molecular weight, in which case the melting point of the amorphous wax is usually much lower than that of the n-paraffin wax.

Amorphous petroleum waxes are further distinguished by the fact that they cannot be separated from admixture with petroleum lubricating oils by the familiar sweating process used to separate straight-chain paraffin waxes from the oil.

The term "paraffin wax" (so-called "crystalline wax") is understood to refer to those hydrocarbon waxes, which are capable of having a plate-like crystalline structure; amorphous waxes do not have this property. Another property of the "crystalline waxes" is their relatively hard brittleness and the fact that they are relatively easily fractured. This kind of wax consists of aliphatic straight chain structures and is substantially free from hydrocarbon waxes having sufficient branching that as a result thereof the blended composition crystallizes in the so-called "mal" form (described, for example, in "Industrial and Engineering Chemistry," November 1945, page 1054 et seq., by Ferris and Cowles).

"Amorphous petroleum wax" and "paraffin wax" are normally separately obtained during the process of refining lubricating oils derived from petroleum. Paraffin wax is obtained from the wax-containing lube oil distillate fraction, and is separated by oil-removal methods, such as chilling and subsequent refining operations (e. g. sweating) to yield the paraffin wax of the kind described above. Most amorphous petroleum waxes, on the other hand, are obtained from the residuum, although such waxes are also obtainable from waxy oil distillate fractions. Usually, the amorphous wax is separated by adding petroleum naphtha to the residuum and then centrifuging or using filter presses. The wax obtained by such a process may contain up to 35 wt.% or more of oil, and may further be deoiled by again dispersing in naphtha and repeating the previous treatments. The wax thus obtained (sometimes also termed "petrolatum wax"), generally contains about 5 wt.% of the heavy lubricating oil fraction. This wax may further be deoiled by treating it at −10° C. with a solvent solution, e. g. a mixture of methyl ethyl ketone, toluene and benzene. Such a treatment produces an amorphous wax substantially free from oil. Amorphous wax obtained by solvent treatment of the high boiling wax distillate to remove oil therefrom, may also be used for preparation of the present novel compositions.

Some illustrative examples of a number of amorphous waxes prepared from "petrolatum" and which may be used to prepare the present compositions, are given in the following table.

| Melting Point, °C. | Color | Approximate Yield On Basis of Petrolatum | Physical Characteristics |
|---|---|---|---|
| 68 | Yellow | About 30 wt. Per Cent | Plastic, sticky. |
| 65 | ...do | | Do. |
| 52 | Brown | About 45 wt. Per Cent | Do. |
| 40 | ...do | | Do. |

The polyalkylenes suitable in the present invention have a molecular weight of at least 6000, are solid, and soften above about 100° C., usually between 110° C. and about 200° C., or higher, depending upon the average molecular weight of the polymer or polymer mixture selected. These suitable alkylene polymers are thermoplastic. The most preferred alkylene polymer for the present purposes is polyethylene. This polyalkylene may have an average molecular weight of above about 10,000; molecular weights as high as 140,000 may be used. Any straight chain alkylene polymer which is tough and flexible over a wide range of temperatures, including low temperatures of the order of about −20° C., and which also has properties very similar or like those of the above specified polyethylene may be incorporated into the amorphous wax for attaining the purposes of the present invention. In general, polyalkylenes of the nature of polyisobutylene which contain branch chains are to be avoided.

Preparation of the present novel compositions is in general attained by swelling the polyalkylene by admixture with the amorphous wax under the influence of heat, and then gradually working in more of the wax and diluting with it until the required low concentration of polyalkylene dispersed in the wax is attained. The inverse of this procedure, that is, taking a few parts by weight of the polyalkylene and adding it to a large portion of the melted amorphous wax, appears to be unsuccessful, for lumps of segregated pieces of the added polyalkylene ensue, and subsequent compatibility and homogeneity of the desired blend with the wax cannot reasonably be attained.

A more preferred and specific procedure within the scope of the general preparation outlined above, is as follows: approximately equal amounts of polyethylene and the amorphous wax are taken and each subdivided into small particles about one-eighth inch square. These are thoroughly mixed with each other, put in a covered container, and held at about 110° C. in an oven for twelve hours. The resultant swelled mass is removed from the oven and worked with a spatula for about ten minutes at 110° C. until a homogeneous syrupy mass is formed. The remainder of the amorphous wax required is then gradually added and blended in with stirring. The melted composition may be allowed to cool and set in a mold; the composition is then removed as a solid cake which is re-melted for later use.

The compositions of the present invention are most suitably used at temperatures above their melting point, particularly for coating of steel, copper, other metal objects, and of cheese, as well as for the sealing off of various capped bottles, etc. Immersion or dipping of the object into the hot melt of the composition is preferred. The object itself, when taken for this purpose, is usually at room temperature (about 25° C.).

These melts may also be used to prepare wet-waxed type of paper, grease proof type of papers, and to coat paper packages by dipping. The coated packages thus prepared are not tacky so that the packages may be stacked or packed against each other without their sticking together. The present compositions are also good for coating the inside walls of steel containers which are thus prepared to contain various liquid media, whether alkaline, neutral, or acidic in character. Hot sprays of the present compositions may be used for applying a coating thereof. In all these cases the present compositions form a protective seal coat.

Solutions or dispersions of the present compositions are useful provided that the solvents or dispersing phase employed, usually liquid hydrocarbon or chloro-hydrocarbons, allow deposition of the initial concentrations of amorphous wax and the polyalkylene at equal rates, or at least at such rates that upon evaporation of the solvent or volatile carrier, the coating thus formed has at least about 3 wt. % and not more than about 30 wt. %, preferably below 20 wt. % of the polyalkylene therein.

Additives which are commonly used in wax compositions may be added to the particular wax compositions of the present invention; thus, powdered graphite, corrosion-inhibiting additives, e. g. dicyclohexylamine nitrite, organic dyes, and pigments may be incorporated.

For purposes of further illustration, reference will now be made to the following examples. it being understood that there is no intention of being limited to the specific conditions disclosed therein. All parts specified in the following examples are parts by weight unless otherwise specified.

*Example 1*

90 parts of white amorphous wax, obtained from a heavy distillate of wax-containing lube oils from East Indies Balikpapan crude petroleum, which wax had a melting point of 40° C., was thoroughly mixed with 10 parts of polyethylene having an average molecular weight of between about 18,000 and 20,000. The resultant melted composition was held at a temperature of about 110° C. and a smoothly machined polished steel rod about one-half inch in diameter was dipped into the melt for about one inch of its length. The end of the rod used for dipping, had sharp right angled edges. The steel rod was thus immersed for less than about five seconds. It was withdrawn and allowed to cool at room temperature. Several rods were thus treated. These rods coated in this manner were found to have a satisfactory adherent coating which was not tacky to the touch. After a sharp knife was cut through the coating, the remainder of it was readily peeled off as a single sheet by gripping. One of the coated rods was allowed to stand for one month, and there was no separation of the coating from the metal, no cracking of the coating even at the sharp edges.

A control test was made with the above specified amorphous wax, used alone. This wax coating could not be peeled away from the metal, but stuck thereto and could not even be chipped or broken away cleanly from the metal. This wax was also relatively too soft and too tacky.

*Example 2*

A test was effected in substantially the same manner as described in Example 1 above, except that 95 parts of yellowish amorphous wax obtained from an undistillable residuum of North American Mid-Continent petroleum crude, and having a melting point of 68° C., and 5 parts of polyethylene, were used to make up a coating composition. The dipping time was approximately 5 seconds. The results obtained from the use of this composition on steel rods were substantially the same as those obtained in Example 1.

*Example 3*

Tests were performed in substantially the same manner as described in Example 2 above, except that the composition comprised 97 parts of the amorphous wax specified therein, and 3 parts of polyethylene. The coating by dipping was effected at temperatures of 120° C., 100° C., and 80° C., respectively. Good protective solid coatings on the steel rods were obtained. These coatings could be readily peeled off as coherent sheets. At higher dipping temperatures, as at 150° C., and 170° C., there was a tendency for the resultant coats to be slightly over-sticky and not to peel as well from the metal as when the lower dipping temperatures were used.

*Example 4*

A test was performed in substantially the same manner as described in Example 2, above, except that 98.5 parts of the amorphous wax specified therein, and 1.5 parts of polyethylene were employed, and the preheating temperature prior to dipping was about 80° C. The resultant coating peeled off satisfactorily as a coherent sheet.

*Example 5*

An experiment was performed in substantially the same manner as described in Example 2 above, except that the coating composition comprised 99.25 parts of the amorphous wax specified therein and 0.75 parts of polyethylene. When using this mixture at temperatures of 160° C., 140° C., 120° C., 100° C., and 80° C., respectively, and then allowing the dip-coatings to cool and stand, the resultant solid coatings on the steel rods did not peel off, but broke off into pieces.

*Example 6*

95 parts of the amorphous wax specified in Example 2, having a melting point of 68° C., was thoroughly mixed with 5 parts of polyisobutylene having an average molecular weight of about 100,000. The resultant composition was melted and a number of steel rods were dipped into the melt for approximately five seconds at temperatures of the melt of 160° C., 140° C., 120° C., 100° C., and 80° C., respectively. After these coatings had been allowed to cool at room temperature, it was found that all of them stuck to the metal so tenaciously that they were even more difficult to remove than was a coating made with the amorphous wax alone. These polyisobutylene-containing coatings could not be peeled off as a coherent sheet away from the metal.

We claim as our invention:

1. The method of preparing a wax composition containing an ethylene polymer having an average molecular weight of from about 6,000 to about 140,000 which comprises; forming a homogeneous blend of an ethylene polymer having an average molecular weight of from about 6,000 to about 140,000 with approximately an equal amount of an amorphous petroleum wax having a melting point between about 40° C. and about 88° C. at a temperature above the melting point of said wax and then incorporating with said blend at a temperature above the melting point of said wax an additional amount of said wax to obtain a homogeneous wax composition.

2. The method of preparing a wax composition containing an ethylene polymer having an average molecular weight of from about 16,000 to about 35,000 which comprises; forming a homogeneous blend of an ethylene polymer having an average molecular weight of from about 16,000 to about 35,000 with approximately an equal amount of an amorphous petroleum wax having a melting point between about 40° C. and about 88° C., at a temperature above the melting point of said wax and then incorporating with said blend at a temperature above the melting point of said wax an additional amount of said wax to obtain a homogeneous wax composition.

3. The method of preparing a wax composition containing between about 1.5% and about 30% by weight of said composition of an ethylene polymer having an average molecular weight of from about 6,000 to about 140,000 which comprises forming a homogeneous blend of an ethylene polymer having an average molecular weight of from about 6,000 to about 140,000 with approximately an equal amount of an amorphous petroleum wax having a melting point between about 40° C. and about 88° C. at a temperature above the melting point of said wax and then incorporating with said blend at a temperature above the melting point of said wax an additional amount of said wax to obtain a homogeneous wax composition containing between about 1.5% and about 30% by weight ethylene polymer.

4. The method of preparing a wax composition containing between about 1.5% and about 30% by weight of said composition of an ethylene polymer having an average molecular weight of from about 16,000 to about 35,000 which comprises; forming a homogeneous blend of an ethylene polymer having an average molecular weight of from about 16,000 to about 35,000 with approximately an equal amount of an amorphous petroleum wax having a melting point between about 40° C. and about 88° C. at a temperature above the melting point of said wax and then incorporating with said blend at a temperature above the melting point of said wax an additional amount of said wax to obtain a homogeneous wax composition containing between about 1.5% and about 30% by weight ethylene polymer.

5. The method of preparing a wax composition containing between about 5% and about 15% by weight of said composition of an ethylene polymer having an average molecular weight of from about 16,000 to about 35,000 which comprises; forming a homogeneous blend of an ethylene polymer having an average molecular weight of from about 16,000 to about 35,000 with approximately an equal amount of an amorphous petroleum wax having a melting point between about 40° C. and about 88° C. at a temperature above the melting point of said wax and then incorporating with said blend at a temperature above the melting point of said wax an additional amount of said wax to obtain a homogeneous wax composition containing between about 5% and about 15% by weight ethylene polymer.

6. The method of preparing a wax composition containing between about 1.5% and about 5% by weight of said composition of an ethylene polymer having an average molecular weight of from about 18,000 to about 20,000 which comprises; forming a homogeneous blend of an ethylene polymer having an average molecular weight of from about 18,000 to about 20,000 with approximately an equal amount of an amorphous petroleum wax having a melting point between about 60° C. and about 88° C. at a temperature above the melting point of said wax and then incorporating with said blend at a temperature above the melting point of said wax an additional amount of said wax to obtain a homogeneous wax composition containing between about 1.5% and about 5% by weight ethylene polymer.

7. The method of preparing a wax composition containing between about 10% and about 20% by weight of said composition of an ethylene polymer having an average molecular weight of from about 16,000 to about 35,000 which comprises; forming a homogeneous blend of an ethylene polymer having an average molecular weight of from about 16,000 to about 35,000 with approximately an equal amount of an amorphous petroleum wax having a melting point between about 40° C. and about 60° C. at a temperature above the melting point of said wax and then incorporating with said blend at a temperature above the melting point of said wax an additional amount of said wax to obtain a homogeneous wax composition containing between about 10% and about 20% by weight ethylene polymer.

8. The method of preparing a wax composition containing about 10% by weight of said composition of an ethylene polymer having an average molecular weight of from about 18,000 to about 20,000 which comprises forming a homogeneous blend of an ethylene polymer having an average molecular weight of from about 18,000 to about 20,000 with approximately an equal amount of an amorphous petroleum wax having a melting point of about 40° C. at a temperature above the melting point of said wax and then incorporating with said blend at a temperature above the melting point of said wax an additional amount of said wax to obtain a homogeneous wax composition containing about 10% by weight ethylene polymer.

9. The method of preparing a wax composition containing about 1.5% by weight of said composition of an ethylene polymer having an average molecular weight of from about 18,000 to about 20,000 which comprises forming a homogeneous blend of an ethylene polymer having an average molecular weight of from about 18,000 to about 20,000 with approximately an equal amount of an amorphous petroleum wax having a melting point of about 68° C. at a temperature above the melting point of said wax and then incorporating with said blend at a temperature above the melting point of said wax an additional amount of said wax to obtain a homogeneous wax composition containing about 1.5% by weight ethylene polymer.

ROBERT G. LARSEN.
AUGUST A. SCHAERER.

REFERENCES CITED

The following references are of record in the file of this patent:

UNITED STATES PATENTS

| Number | Name | Date |
| --- | --- | --- |
| 1,098,368 | Caffall | June 2, 1914 |
| 2,298,846 | Skooglund | Oct. 13, 1942 |
| 2,339,958 | Sparks | Jan. 25, 1944 |
| 2,453,644 | Steinkraus | Nov. 9, 1948 |

OTHER REFERENCES

British Plastics, May, 1945, pp. 213–214.
British Plastics, March, 1945, pp. 94–96.